(12) United States Patent
Li et al.

(10) Patent No.: US 10,356,108 B2
(45) Date of Patent: Jul. 16, 2019

(54) SYSTEM AND METHOD OF DETECTING MALICIOUS MULTIMEDIA FILES

(71) Applicant: McAfee, LLC, Santa Clara, CA (US)

(72) Inventors: Haifei Li, Burnaby (CA); Bing Sun, Santa Clara, CA (US); Chong Xu, Sunnyvale, CA (US)

(73) Assignee: MCAFEE, LLC, Santa Clara, CA (US)

( * ) Notice: Subject to any disclaimer, the term of this patent is extended or adjusted under 35 U.S.C. 154(b) by 3 days.

(21) Appl. No.: 15/039,761

(22) PCT Filed: Dec. 27, 2013

(86) PCT No.: PCT/US2013/078087
§ 371 (c)(1),
(2) Date: May 26, 2016

(87) PCT Pub. No.: WO2015/099780
PCT Pub. Date: Jul. 2, 2015

(65) Prior Publication Data
US 2017/0026392 A1    Jan. 26, 2017

(51) Int. Cl.
*H04L 29/06* (2006.01)
*G06F 16/14* (2019.01)
(Continued)

(52) U.S. Cl.
CPC ........ *H04L 63/1416* (2013.01); *G06F 16/152* (2019.01); *G06F 16/435* (2019.01);
(Continued)

(58) Field of Classification Search
CPC ................. H04L 63/1416; H04L 69/16; G06F 17/30029; G06F 17/30109; G06F 17/30864; G06F 21/56; G06F 21/562
See application file for complete search history.

(56) References Cited

U.S. PATENT DOCUMENTS 6,282,698 B1 *  8/2001  Baker .................. G06F 8/75
                                                717/118
8,291,497 B1 * 10/2012  Griffin ............... G06F 21/564
                                                709/224
(Continued)

FOREIGN PATENT DOCUMENTS

EP         3087527       11/2016
JP     2010-092174 A      4/2010
(Continued)

OTHER PUBLICATIONS

Ford et al., Analyzing and Detecting Malicious Flash Advertisements, 2009 Annual Computer Security Applications Conference, pp. 363-372 (Year: 2009).*

(Continued)

*Primary Examiner* — Luu T Pham
*Assistant Examiner* — Harvey I Cohen
(74) *Attorney, Agent, or Firm* — Hanley, Flight & Zimmerman, LLC

(57) ABSTRACT

Systems and methods for detection of malicious exploitations in a multimedia file are disclosed. In one embodiment, such an approach includes parsing the compiled bytecode of a multimedia file to detect identified key instructions and determine if such key instructions are repeated in specific patterns that signify the presence of malicious exploitation. The approach may also include examining the contents of the constant pool table in a compiled multimedia file to detect specific shellcode strings that are indicative of presence of malicious exploitation. When the bytecode or the constant pool table indicates that malicious exploitation is present, an approach may be utilized to reduce instances of false positive identification of malicious exploitation.

22 Claims, 8 Drawing Sheets

(51) Int. Cl.
G06F 16/435 (2019.01)
G06F 16/951 (2019.01)
G06F 21/56 (2013.01)

(52) U.S. Cl.
CPC ............ *G06F 16/951* (2019.01); *G06F 21/56* (2013.01); *G06F 21/562* (2013.01); *H04L 69/16* (2013.01)

(56) References Cited

U.S. PATENT DOCUMENTS

| | | | | |
|---|---|---|---|---|
| 8,516,590 | B1* | 8/2013 | Ranadive | H04L 63/1433 713/187 |
| 8,763,128 | B2 | 6/2014 | Lim et al. | |
| 8,850,571 | B2 | 9/2014 | Staniford et al. | |
| 9,003,501 | B2 | 4/2015 | Navaraj et al. | |
| 2005/0265331 | A1* | 12/2005 | Stolfo | G06F 21/552 370/389 |
| 2007/0006293 | A1* | 1/2007 | Balakrishnan | H04L 63/0245 726/13 |
| 2007/0240217 | A1* | 10/2007 | Tuvell | G06F 21/56 726/24 |
| 2010/0031359 | A1* | 2/2010 | Alme | G06F 21/56 726/24 |
| 2011/0185077 | A1* | 7/2011 | Bremler-Barr | H03M 7/3086 709/231 |
| 2011/0289582 | A1* | 11/2011 | Kejriwal | G06F 21/566 726/22 |
| 2014/0033311 | A1* | 1/2014 | Li | G06F 21/561 726/24 |
| 2014/0122052 | A1* | 5/2014 | Liu | G06F 21/54 703/23 |
| 2015/0058992 | A1* | 2/2015 | El-Moussa | H04L 63/145 726/24 |

FOREIGN PATENT DOCUMENTS

| | | |
|---|---|---|
| JP | 2010-262609 A | 11/2010 |
| WO | 2015099780 | 7/2015 |

OTHER PUBLICATIONS

Schmitt et al., PDF Scrutinizer: Detecting JavaScript-based attacks in PDF documents, 2012 Tenth Annual International Conference on Privacy, Security and Trust, pp. 104-111 (Year: 2012).*

Chuan et al., Automated blocking of malicious code with NDIS intermediate driver, 13th International Conference on Advanced Communication Technology (ICACT2011), 2011, pp. 700-704 (Year: 2011).*

Ford, S., et al., (2009), "Analyzing and Detecting Malicious Flash Advertisements", 2009 Annual Computer Security Applications Conference, IEEE, pp. 363-372.

Van Overveldt, et al., (2012), "FlashDetect: ActionScript 3 Malware Detection", Research in Attacks, Intrusions, and Defenses, pp. 274-293.

International Searching Authority, "International Search Report and Written Opinion," issued in connection with International Patent Application No. PCT/US2013/078087, dated Sep. 22, 2014, 10 pages.

European Patent Office, "Extended European Search Report," issued in connection with European Patent Application No. 13900103.6, dated Jun. 20, 2017, 9 pages.

European Patent Office, "Communication pursuant to Rules 70(2) and 70a(2) EPC," issued in connection with European Patent Application No. 13900103.6, dated Jul. 7, 2017, 1 page.

Japan Patent Office, "Notice of Reasons for Rejection," issued in connection with Japanese Patent Application No. 2016-542911, dated Jul. 25, 2017, 5 pages.

Japan Patent Office, "Notice of Reasons for Rejection," issued in connection with Japanese Patent Application No. 2016-542911, dated Oct. 31, 2017, 5 pages.

Japan Patent Office, "Notice of Allowance," issued in connection with Japanese Patent Application No. 2016-542911, dated Feb. 6, 2018, 3 pages. (No translation available).

Bazzi et al., "IDS for Detecting Malicious Non-Executable Files Using Dynamic Analysis," 15th Asia-Pacific, Network Operations and Management Symposium (APNOMS), Hiroshima, Japan: IEEE, Sep. 25, 2013, 3 pages.

Marques et al., "A Multimedia Traffic Classification Scheme for Intrusion Dectection Systems," Third International Conference on Information Technology and Applications: ICTA: IEEE, 2005, 6 pages.

International Bureau, "International Preliminary Report on Patentability," issued in connection with International Patent Application No. PCT/US2013/078087, dated Jun. 28, 2016, 6 pages.

State Intellectual Property Office of the People's Republic of China, "First Office Action," issued in connection with Chinese Patent Application No. 201380081284.5, dated Mar. 13, 2018, 15 pages.

Van Overveldt et al., "FlashDetect: ActionScript 3 malware detection," Springer Berlin Heidelberg, pp. 274-293, Sep. 2012, 20 pages.

European Patent Office, "Communication under Rule 71(3) EPC," issued in connection with European Patent Application No. 13900103.6, dated Mar. 12, 2019, 5 pages.

* cited by examiner ins[0]     xxxx ins[1]     xxxx

. .

. .

. .

ins[a]     callpropvoid <q>[public]::writeInt

. .

. .

ins[b]     callpropvoid <q>[public]::writeInt

. .

. .

ins[c]     callpropvoid <q>[public]::writeInt

. .

. .

ins[d]     callpropvoid <q>[public]::writeInt

SYSTEM AND METHOD OF DETECTING MALICIOUS MULTIMEDIA FILES

TECHNICAL FIELD

This disclosure relates generally to network security management and in particular to systems and methods for detecting malicious exploitation of multimedia files.

BACKGROUND

Adobe Flash® (Flash) (Adobe Flash is a registered trademark of Adobe Systems Incorporated) is a multimedia and software platform that provides advanced video playback and animation capabilities to developers and can be used to author vector graphics, animations, games and rich internet applications (RIAs). Flash is also frequently used to add streamed video or audio players, advertisement and interactive multimedia content to web pages. For example, Flash files, having a Shockwave Flash or Small Web Format (SWF), are often embedded into webpages to be played by a browser plugin, or are embedded into Adobe® (Adobe is a registered trademark of Adobe Systems Incorporated) Portable Document Format (PDF) files to be played by a copy of a Flash Player included in Adobe's Acrobat Reader software.

As the use of Flash in a variety of applications has increased in recent years, so has the occurrence of malware targeting Flash files. Malicious exploitations of Flash files can be very harmful because even though SWFs are sometimes thought of as pictures, they can carry full applications which can be maliciously manipulated. Despite the increasing occurrence of Flash exploitations and the importance of successful solutions to these attacks, however, there have been very few effective methods of detecting and removing these security risks.

One method currently used for checking to see if a Flash file contains malware is to merely run the code to see what happens. This method is known as runtime code analysis or dynamic code analysis. Dynamic code analysis might be useful when operating in a safe testing environment, where a debugger can track values of variables and trace function calls to give an accurate overview of the application's internal structure, but it is hardly practical for use outside of the testing environment when the code is actually being executed on a device and can cause harm if it includes malware. Moreover, a malicious exploit may be able to recognize that it is being run in a runtime or dynamic code analysis and may not behave maliciously to prevent being identified.

Another process for determining if a Flash file contains malware is through static code analysis during which the file is disassembled and analyzed before being executed. Current methods of static code analysis for detection of malware in Flash files are generally signature-based and rely on a case by case analysis. These methods are generally not efficient or effective and can result in identifying a significant number of false positives. The following disclosure addresses these and other issues.

BRIEF DESCRIPTION OF THE DRAWINGS

FIG. 4A is an example of malicious instructions included in the bytecode of a Flash file block according to one or more disclosed embodiments.

DESCRIPTION OF DISCLOSED EMBODIMENTS

Flash files are being increasingly targeted for malicious exploitation. To effectively detect and remove such exploitations, a detection approach which is generic and not signature based and can identify risks without running the code can be utilized. In one embodiment, such an approach includes parsing the compiled bytecode of a Flash file to detect identified key instructions and determine if such key instructions are repeated in specific patterns that signify the presence of malicious exploitation. The approach may also include examining the contents of the constant pool table in a compiled Flash file to detect specific shellcode strings that are indicative of presence of malicious exploitation. When the bytecode or the constant pool table indicates that malicious exploitation is present, an approach may be utilized to reduce instances of false positive identification of malicious exploitation.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a programmable device" can refer to a single programmable device or a plurality of programmable devices working together to perform the function described as being performed on or by a programmable device.

Figure 1:
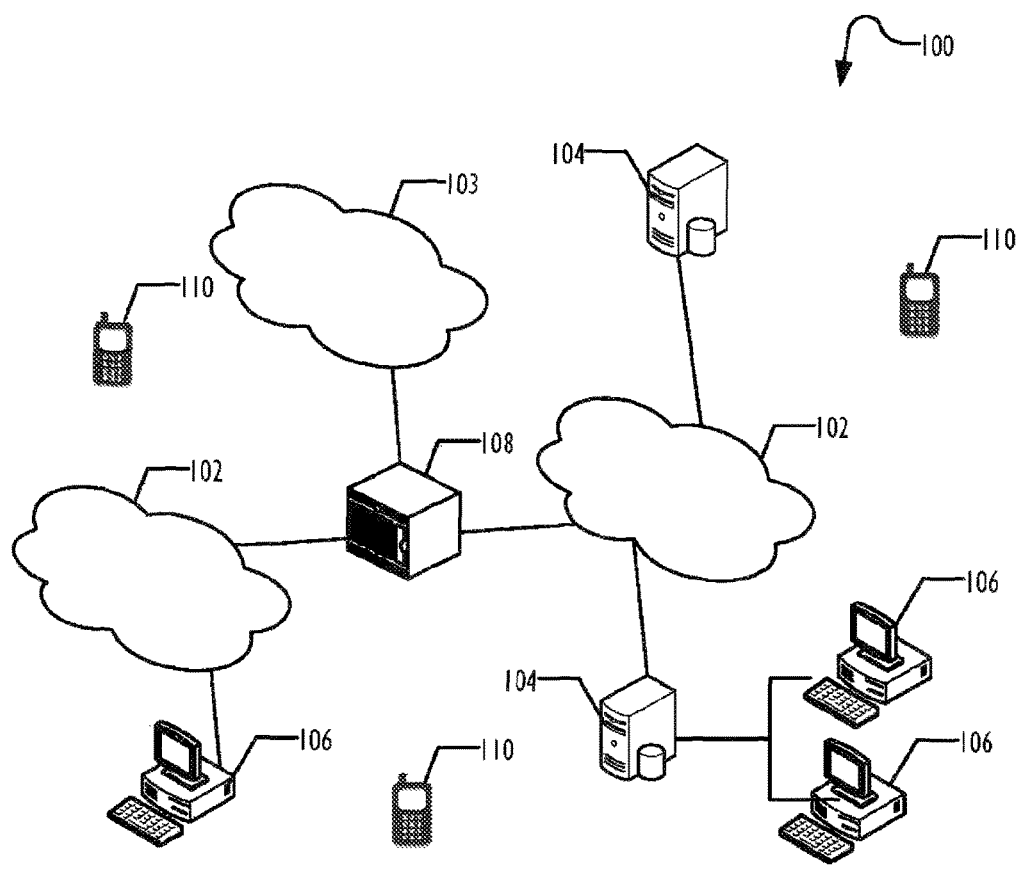
FIG. 1 is a block diagram illustrating a network architecture infrastructure according to one or more disclosed embodiments.

Referring now to FIG. 1, an example infrastructure 100 is shown schematically. Infrastructure 100 contains computer networks 102 which may include many different types of computer networks available today, such as the Internet, a corporate network, or a Local Area Network (LAN). Each of these networks can contain wired or wireless devices and operate using any number of network protocols (e.g., TCP/IP). Networks 102 are connected to gateways and routers (represented by 108), end user computers 106 and computer servers 104. Also shown in infrastructure 100 is a cellular network 103 for use with mobile communication devices. As is known in the art, mobile cellular networks support mobile phones and many other types of devices (e.g., tablet computers not shown). Mobile devices in the infrastructure 100 are illustrated as mobile phones 110.

In a network such as displayed in FIG. 1, Flash files can be monitored and analyzed to detect malware in accordance with one or more embodiments disclosed herein. One or more software programs or appliances may be used to monitor and analyze Flash files in the network and conduct a static analysis on the files to detect malicious content within them.

Figure 2:
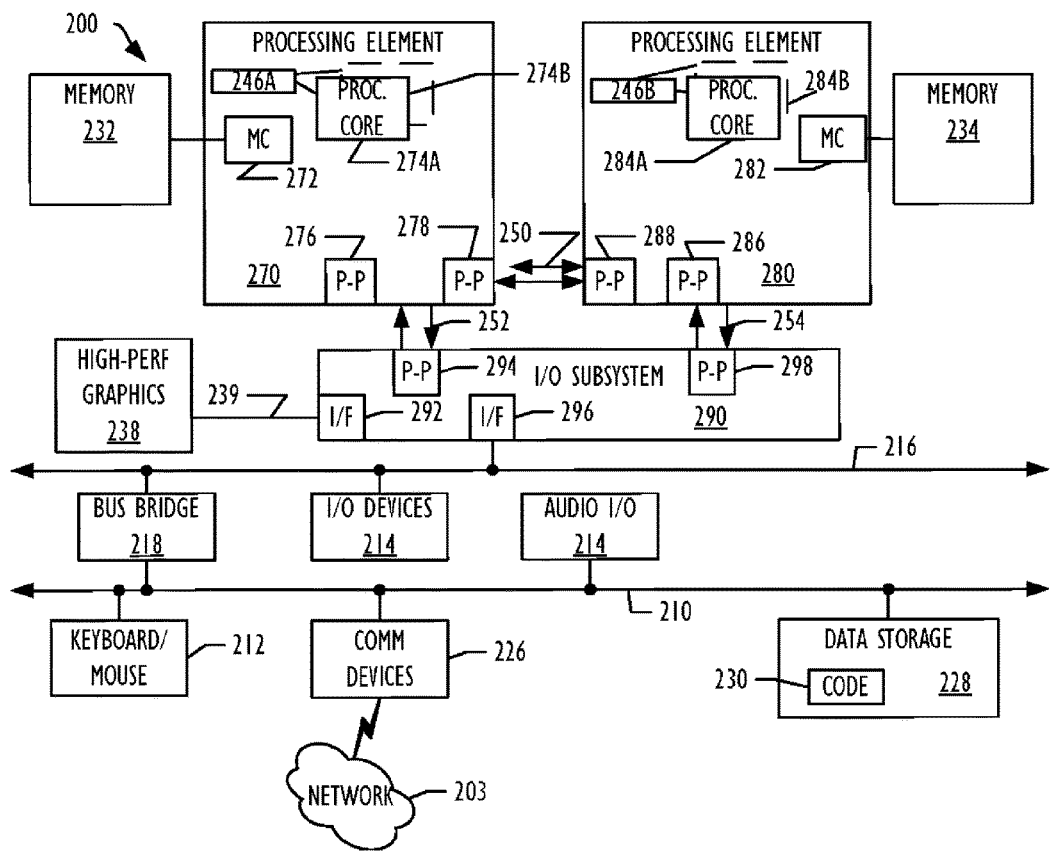
FIG. 2 is a block diagram illustrating a programmable device for use with techniques described herein according to one embodiment.

Referring now to FIG. 2, a block diagram illustrates a programmable device 200 that may employ the malicious content detection approach in accordance with one embodiment. The programmable device illustrated in FIG. 2 is a multiprocessor programmable device 200 that includes a first processing element 270 and a second processing element 280. While two processing elements 270 and 280 are shown, an embodiment of programmable device 200 may also include only one such processing element.

Programmable device 200 is illustrated as a point-to-point interconnect system, in which the first processing element 270 and second processing element 280 are coupled via a point-to-point interconnect 250. Any or all of the interconnects illustrated in FIG. 2 may be implemented as multi-drop bus rather than point-to-point interconnects.

As illustrated in FIG. 2, each of processing elements 270 and 280 may be multicore processors, including first and second processor cores (i.e., processor cores 274*a* and *b* and processor cores 284*a* and 284*b*). Such cores 274*a*, 274*b*, 284*a*, 284*b* may be configured to execute instruction code in a manner disclosed herein in connection with FIGS. 5 and 6A-6B. However, other embodiments may use processing elements that are single core processors as desired. In embodiments with multiple processing elements 270, bb, each processing element may be implemented with different numbers of cores as desired.

Each processing element 270, 280 may include at least one shared cache 246. The shared cache 246*a*, 246*b* may store data (e.g., instructions) that are utilized by one or more components of the processing element, such as the cores 274*a*, 274*b* and 284*a*, 284*b*, respectively. For example, the shared cache may locally cache data stored in a memory 232, 234 for faster access by components of the processing elements 270, 280. In one or more embodiments, the shared cache 246*a*, 246*b* may include one or more mid-level caches, such as level 2 (L2), level 3 (L3), level 4 (L4), or other levels of cache, a last level cache (LLC), or combinations thereof.

While FIG. 2 illustrates a programmable device with two processing elements 270, 280 for clarity of the drawing, the scope of the present invention is not so limited and any number of processing elements may be present. Alternatively, one or more of processing elements 270, 280 may be an element other than a processor, such as an graphics processing unit (GPU), a digital signal processing (DSP) unit, a field programmable gate array, or any other programmable processing element. Processing element 280 may be heterogeneous or asymmetric to processing element 270.

There can be a variety of differences between the processing elements 270, 280 in terms of a spectrum of metrics of merit including architectural, microarchitectural, thermal, power consumption characteristics, and the like. These differences may effectively manifest themselves as asymmetry and heterogeneity amongst the processing elements 270, 280. In some embodiments, the various processing elements 270, 280 may reside in the same die package.

First processing element 270 may further include memory controller logic (MC) 272 and point-to-point (P-P) interconnects 276 and 278. Similarly, second processing element 280 may include a MC 282 and P-P interconnects 286 and 288. As illustrated in FIG. 2, MCs 272 and 282 couple the processing elements 270, 280 to respective memories, namely a memory 232 and a memory 234, which may be portions of main memory locally attached to the respective processors. While MC logic 272 and 282 is illustrated as integrated into the processing elements 270, 280, in some embodiments the MC logic may be discrete logic outside the processing elements 270, 280 rather than integrated therein.

Processing element 270 and processing element 280 may be coupled to an I/O subsystem 290 via P-P interconnects 276, 286 and 284, respectively. As illustrated in FIG. 2, I/O subsystem 290 includes P-P interconnects 294 and 298. Furthermore, I/O subsystem 290 includes an interface 292 to couple I/O subsystem 290 with a high performance graphics engine 238. In one embodiment, bus 249 may be used to couple graphics engine 238 to I/O subsystem 290. Alternately, a point-to-point interconnect 239 may couple these components.

In turn, I/O subsystem 290 may be coupled to a first link 216 via an interface 296. In one embodiment, first link 216 may be a Peripheral Component Interconnect (PCI) bus, or a bus such as a PCI Express bus or another I/O interconnect bus, although the scope of the present invention is not so limited.

As illustrated in FIG. 2, various I/O devices 214 may be coupled to first link 216, along with a bridge 218 which may couple first link 216 to a second link 210. In one embodiment, second link 220 may be a low pin count (LPC) bus. Various devices may be coupled to second link 220 including, for example, a keyboard/mouse 212, communication device(s) 226 (which may in turn be in communication with the computer network 203), and a data storage unit 228 such as a disk drive or other mass storage device which may include code 230, in one embodiment. The code 230 may include instructions for performing embodiments of one or more of the techniques described above. Further, an audio I/O 224 may be coupled to second bus 220.

Note that other embodiments are contemplated. For example, instead of the point-to-point architecture of FIG. 2, a system may implement a multi-drop bus or another such communication topology. Although links 216 and 220 are illustrated as busses in FIG. 2, any desired type of link can be used. Also, the elements of FIG. 2 may alternatively be partitioned using more or fewer integrated chips than illustrated in FIG. 2.

Figure 3:
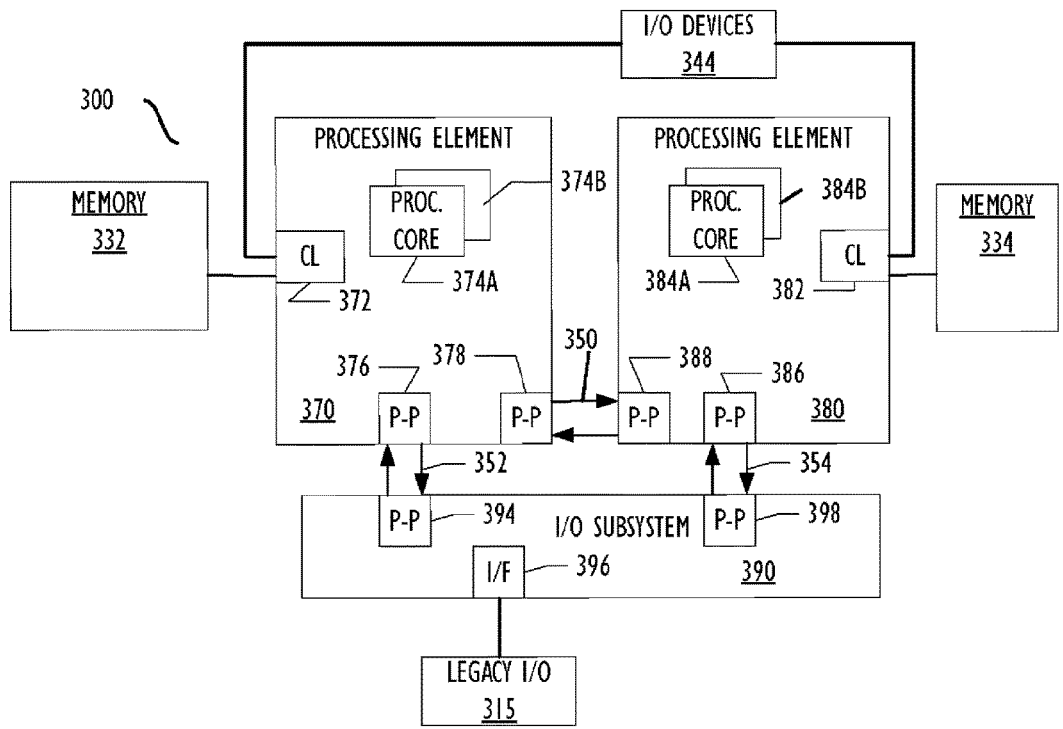
FIG. 3 is a block diagram illustrating a programmable device for use with techniques described herein according to another embodiment.

Referring now to FIG. 3, a block diagram illustrates a programmable device 300 according to another embodiment. Certain aspects of FIG. 2A have been omitted from FIG. 3 in order to avoid obscuring other aspects of FIG. 3.

FIG. 3 illustrates that processing elements 370, 380 may include integrated memory and I/O control logic ("CL") 372 and 382, respectively. In some embodiments, the CL 372, 382 may include memory control logic (MC) such as that described above in connection with FIG. 2. In addition, CL 372, 382 may also include I/O control logic. FIG. 3 illustrates that not only may the memories 332, 334 be coupled to the CL 372, 382, but also that I/O devices 314 may also be coupled to the control logic 372, 382. Legacy I/O devices 315 may be coupled to the I/O subsystem 390.

The programmable devices depicted in FIGS. 2 and 3 are schematic illustrations of embodiments of programmable devices which may be utilized to implement various embodiments discussed herein. It will be appreciated that various components of the programmable devices depicted in FIGS. 2 and 3 may be combined in a system-on-a-chip (SoC) architecture.

Embodiments of the inventions disclosed herein may include software. As such, we shall provide a description of common computing software architecture. Like the hardware examples, the software architecture discussed here is not intended to be exclusive in any way but rather illustrative.

We now turn to a discussion of various embodiments for detecting malicious content in a file. The embodiments described herein may apply to any files created by or containing bytecode of an intermediate language. In particular, the embodiments apply to files with sources codes which can be transformed into a bytecode type of code by a compiler or interpreter. Flash files are one example of such files. Flash files can be programmed using an object-oriented language called ActionScript. ActionScript used in Flash files is an example of the intermediate language. At the time of this disclosure, three versions of ActionScript exist. These include ActionScript, ActionScript 2, and ActionScript 3. ActionScript code is typically transformed into bytecode format by a compiler.

A Flash file generally starts with the string "FWS" or "CWS", followed by an 8-bit version number, a 32-bit file length field, and compressed or uncompressed data. The uncompressed data portion includes a header followed by a list of tags. Each tag acts as a container for a data type, e.g. an ActionScript bytecode. A tag starts with a tag type identifier and the tag's length, followed by data. Thus the complete structure of a Flash file is generally as shown below:

[FWS/CWS] [Version] [Length] [[Header] [[Tag Header] [Tag Contents]] . . . [0] ]

Some of the tags in the file structure contain program logic and those tags are of special interest to this disclosure as they are typically where most of malware content is located. Of particular interest is the ActionScript bytecode. That is because most malicious exploitations of Flash files are developed using ActionScript code which is then transformed into bytecode. By examining the bytecode then a lot of these Flash exploitations may be detected.

Depending on the version of ActionScript used, bytecode may be contained in different types of tags. For example, ActionScript 2 bytecode can reside in one of the following tags: DoInitAction, DoAction, PlaceObject2, PlaceObject3, DefineButton, or DefineButton2. ActionScript 3 bytecode, on the other hand, is generally contained in DoABCDefine or DoABC tags. Knowing these locations, a bytecode level parser can quickly locate the bytecode in a Flash file and examine its contents.

There are a variety of exploitation methods that target Flash files. The most common types of these methods include heap spraying, just-in-time (JIT) spraying, and advanced Flash-heap crafting. Heap spraying in Flash is generally performed using a Flash public class referred to as ByteArray. The ByteArray class enables reading and writing of arbitrary bytes, binary representation of integers, floating points, and strings. The implementation of the ByteArray class in Flash utilizes a contiguous portion of memory that is expandable when necessary to store the contents of the array. Because it provides access to expandable memory, ByteArray is a prime candidate for use in malicious exploitation. A ByteArray containing a write instruction is often used in this process and the ByteArray is copied repeatedly to write a significant amount of data to the ByteArray until it covers a large portion of the memory space.

The write instructions used in this process are often certain Flash Public Application Programming interface (API) calls that involve writing. These include API calls such as, "writeUnsignedInt", "writeInt", and "writeByte." When the exploitation is developed using an ActionScript, these API calls can be found in the bytecode. By examining current and past Flash-based exploitation methods, the inventors have discovered that a specific list of key instructions are commonly present in the bytecode of Flash files containing malicious exploitation. Some of these instructions contain the API calls discussed above and some do not. The following is an example of some of the key instructions that are most commonly used to target Flash files:

```
bitxor
bitor
in
callpropvoid <q>[public]::writeByte
callproperty <q>[public]::writeByte
callpropvoid <q>[public]::writeDouble
callproperty <q>[public]::writeDouble
callpropvoid<q>[public]::writeFloat
callproperty <q>[public]::writeFloat
callpropvoid<q>[public]::writeInt
callproperty <q>[public]::writeInt
callpropvoid<q>[public]::writeShort
callproperty <q>[public]::writeShort
callpropvoid<q>[public]::writeUnsignedInt
callproperty <q>[public]::writeUnsignedInt
```

Although the identified instructions have been found indicative of malicious content in a Flash file, a single occurrence of these instructions is generally not a sign of exploitation. In general, a key instruction is repeated multiple times in a malicious Flash file. FIG. 4A illustrates an example of such an instruction and the manner in which it may be repeated. As shown, the instruction "callpropvoid <q>[public]::writeInt" is repeated multiple times at ins[a], ins[b], ins[c], and ins[d]. The dots illustrate that there may be additional lines of instructions between each occurrence of the key instructions shown. The inventors have discovered that malicious Flash files generally contain multiple occurrence of a key instruction at fixed distances from one another. For example, a key instruction may be repeated every 100 lines of code (every 100th instruction) in the compiled bytecode. In the example illustrated in FIG. 4A, this means that the distance between ins[a] and ins[b] is the same as the distance between ins[b] and ins[c], which is also the same as the distance between ins[c] and ins[d]. Thus, when a key instruction is repeated multiple times in the bytecode, if the distances between all consecutive repetitions are the same, the file may be malicious. In general, in addition to having equidistant repetitions of a key instruction, a malicious file also includes a minimum number of these equidistant repetitions. This minimum number may be different for each different key instruction. For example, the key instructions identified below are generally repeated for the minimum number of times indicated next to them:

```
bitxor - 50 times or more
bitor - 50 times or more
in - 50 times or more
callpropvoid <q>[public]::writeByte - 40 times or more
callproperty <q>[public]::writeByte - 40 times or more
callpropvoid<q>[public]::writeInt - 10 times or more
callproperty <q>[public]::writeInt - 10 times or more
callpropvoid<q>[public]::writeShort - 20 times or more
callproperty<q>[public]::writeShort - 20 times or more
callpropvoid<q>[public]::writeUnsignedInt - 10 times or more
callproperty <q>[public]::writeUnsignedInt - 10 times or more
```

The minimum number of repetitions for each key instruction may different in different embodiments. In one embodiment, the minimum number of repetitions is the same for all key instructions. In an alternative embodiment, there is no minimum number of repetitions.

Figure 4B:
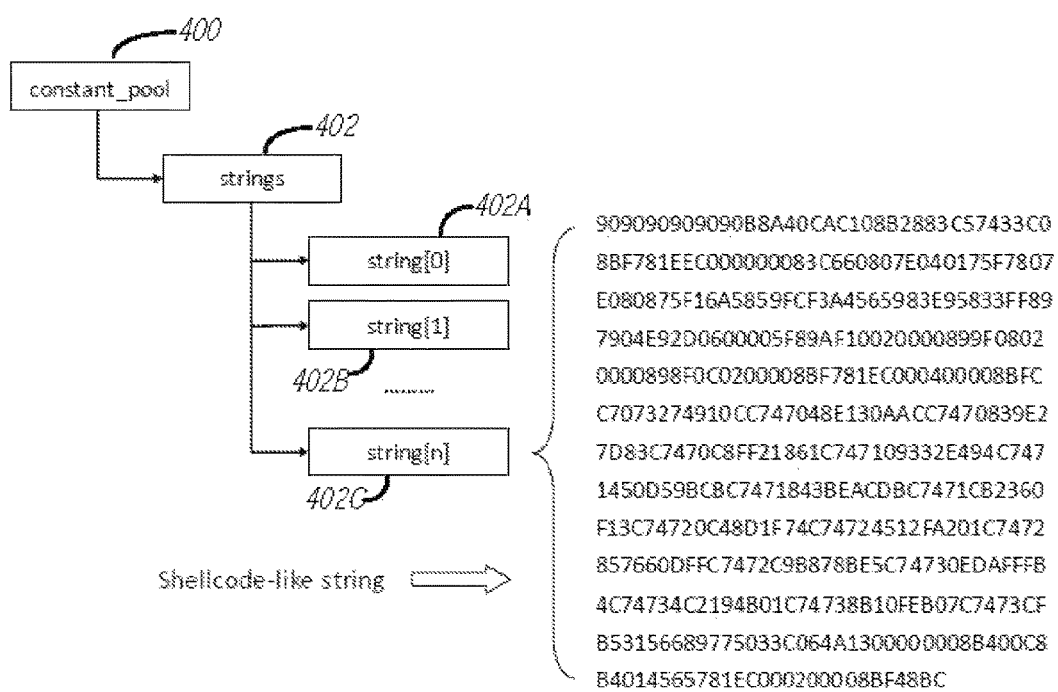
FIG. 4B is an example of shellcode strings included in the constant pool table of a Flash file according to one or more disclosed embodiments.

Another common method of targeting Flash files for exploitation is to store shellcode in one or more ActionScript strings. This generally occurs when exploit developers include shellcode strings in the ActionScript source code of a Flash file. When the Flash file is compiled, these shellcode strings are generally stored in one or more data structures that store constants. For most Flash files this data structure is referred to as the constant pool table of the compiled code. The constant pool table for a Flash file is generally where most of the constant values are stored. This includes values such as numbers, strings, identifier names, references to classes and methods, and type descriptors. As the constant pool table is generally the location where strings are stored in a compiled Flash file, shellcode strings included in the ActionScript source code are often stored in the constant pool when the file is compiled. An example of such a string is illustrated in FIG. 4B where a constant pool 400 includes a set of strings 402. The strings 402 may contain a number of strings including string[0] 402A, string[1] 402B, . . . , and string[n] 402N. As shown, the string[n] 402N in this example stores a shellcode like string. By reviewing all known Flash exploitations, the inventors have found that the shellcode strings used for malicious exploitation have some common characteristics. This finding along with the knowledge of the list of key instructions used in the bytecode is utilized in embodiments discussed in this disclosure to quickly, efficiently and statically detect malicious content in Flash files.

Figure 5:
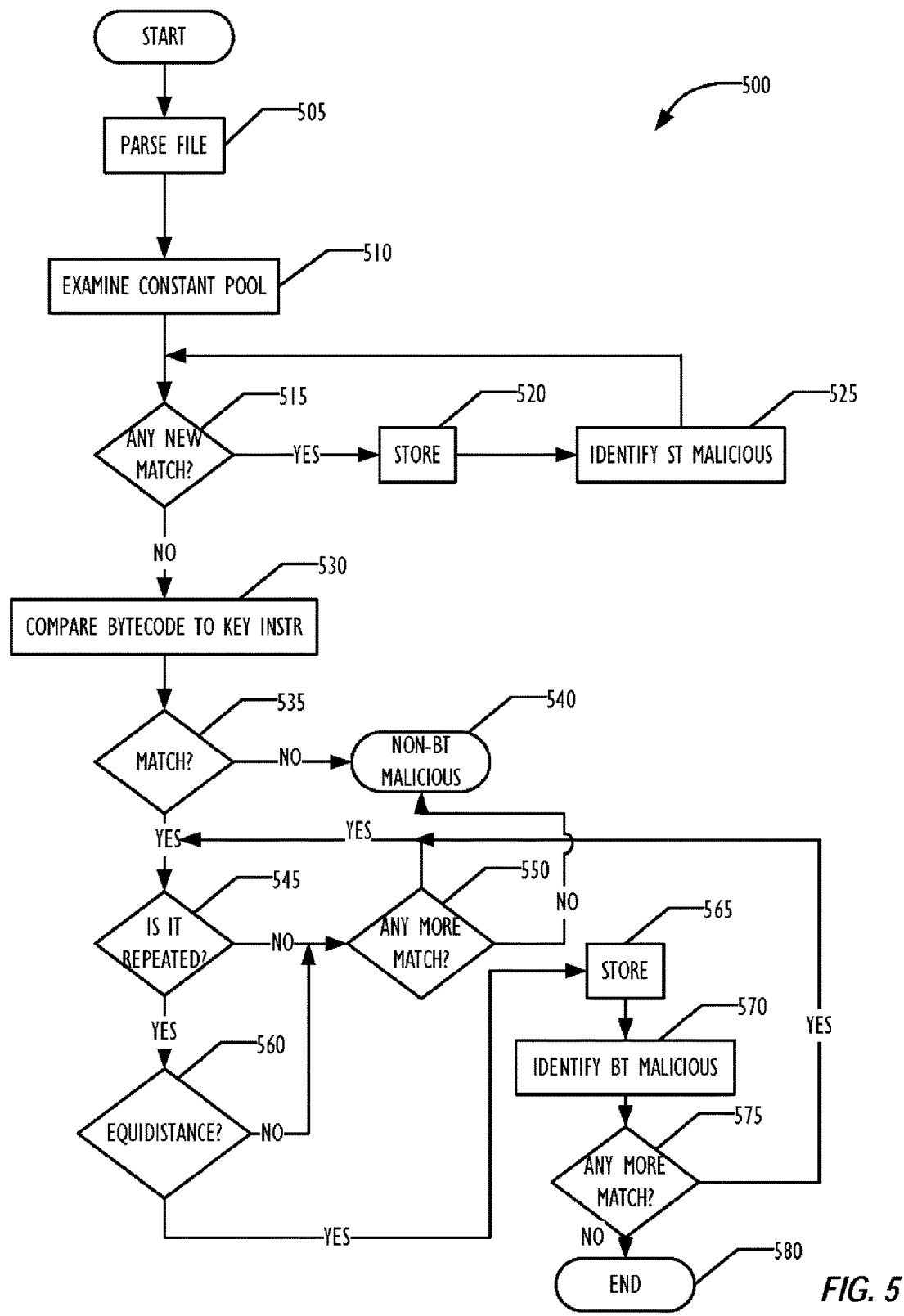
FIG. 5 is a flow diagram of Flash malware detection approaches according to one or more disclosed embodiments.

Referring to FIG. 5, an operation 500 for detecting malware in Flash file may start by parsing the code to examine the file's contents (block 505). Any parser compatible with a Flash file may be used for this purpose. In one embodiment, an ABC bytecode parser is used for ActionScript 3 bytecode. The parser examines the contents of the constant pool table to determine if it contains malware (block 510). This may be done by analyzing all strings in the constant pool table through a shellcode logic. The shellcode logic may include a database containing a list of known shellcodes used in a Flash file. Additionally, the shellcode logic may also contain logic that helps identify shellcode-like strings. In one embodiment, the shellcode logic identifies hex strings having characteristics that are indicative of shellcodes. In one configuration, these characteristics include a string length that is larger than a specific threshold (e.g., 1,000), and is an even number. In another embodiment, the characteristics include having a string in which every byte in the string is in a specific range (e.g., ['A'-'F'], ['a'-'f'], or ['0'-'9']).

If any of the strings in the constant pool table matches with one of the strings in the database or is identified as being shellcode like by the shellcode logic (the "YES" prong of block 515), the identified shellcode is stored in a memory (block 520) and the file is identified as containing malicious strings (block 525). At this point, the operation 500 returns to block 515 to determine if the constant pool table contains any other shellcode like strings. If no other shellcode like strings are identified (the "No" prong of block 515), the operation moves to block 530 to parse the bytecode and compare instructions present in the bytecode to a list of key instructions that have been identified as being indicative of malicious content (block 530). The list of key instructions is generally pre-determined, but may be dynamically changed in one embodiment. For example, as new key instructions are identified, the list may be updated to include the new instructions.

If none of the instructions in the bytecode match any of the key instructions in the list (the "NO" prong of block 535), then the bytecode may be identified as not having any malicious bytecode content (block 540). If the bytecode does include an instruction that matches with one of the key instructions in the list (the "YES" prong of block 535), however, the operation determines if the matched instruction is repeated more than once in the bytecode (block 545). In one embodiment, at this stage, the operation not only determines if the matched instruction is repeated, it also looks to see if the instruction is repeated a required minimum of times. As discussed above, certain instructions may need to be repeated a specific minimum number of times to be indicative of malicious exploitation. Thus, the operation may determine if the instruction is repeated at least the minimum number of times. When a matched instruction is not repeated (or is not repeated the minimum number of times) (the "NO" prong of block 545), then the occurrence is most likely not indicative of a malicious instruction and the operation moves to block 550 to determine if there are no other instructions in the bytecode that match with any of the key instructions. If the bytecode contains more matching instructions (the "YES" prong of block 550), then the operation moves back to block 545. If, the bytecode does not, however, contain any more matching instructions, the operation moves to block 540 to identify the file as not containing malicious bytecode. Thus, when instructions in the bytecode do not match with any of the key instructions in the list, the matched instruction(s) are not repeated, or a predetermined number of the matched instructions are not repeated by the same distance, then the bytecode may be determined to be free of malicious content.

When one matched instructions is determined to be repeated more than once in the bytecode (or repeated at least the minimum number of times) (the "YES" prong of block 545), the operation then calculates the distance between the first and the second occurrence of the instruction and the second and the third occurrence of the instruction and so on to determine if the distance between each of those consecutive occurrences is the same as the other ones. In one embodiment, the distance between each repeated occurrence of a key instruction refers to the lines of code between each occurrence. If distances between each two consecutive occurrence of the matched instruction are the same (the "YES" prong of block 560), then the instruction is stored as a malicious instruction (block 565) and the Flash file is identified as containing malicious bytecode content. Even though one instruction may have been identified as being malicious, the operation continues examining the rest of the instructions to determine if there are more matches with the list of key instructions (block 575). If more matching instructions are found (the "YES" prong of block 575), the operation 500 moves to block 454 to determine if the newly found instruction is repeated. If no other matching instructions are found, the operation may end (block 580).

Although the process of examining the constant pool table and analyzing the bytecode occur consecutively in this embodiment, these two operations may occur separately. Alternative approaches may include only one of these two processes. In other embodiments, the process of examining the bytecode may occur prior to examining the constant pool table. In such a case, the operation may stop if one or more malicious instructions are found in the bytecode. Alternatively, the operation may continue to examine the constant pool table even if the bytecode has been identified as containing malicious content.

As the detection approaches discussed herein merely involves statically parsing the bytecode and analyzing the constant pool table against a shellcode logic, the approach is easy to implement and will have minimal impact on performance of the remaining operations. Thus these approaches can quickly and efficiently identify malicious content in a Flash file. Moreover, as the approaches are generic and not signature-based, they can be used for any type of Flash file. Additionally, these approaches can detect both known and unknown malicious content. This is because these approaches only involve identifying instructions and shellcode strings that are indicative of malware. These pre-identified instructions or shellcode may indicate exploitations, but they do not necessarily indicate known vulnerabilities. By using these pre-identified instructions and shellcode strings, the operation can detect known and unknown exploits.

Figure 6A:
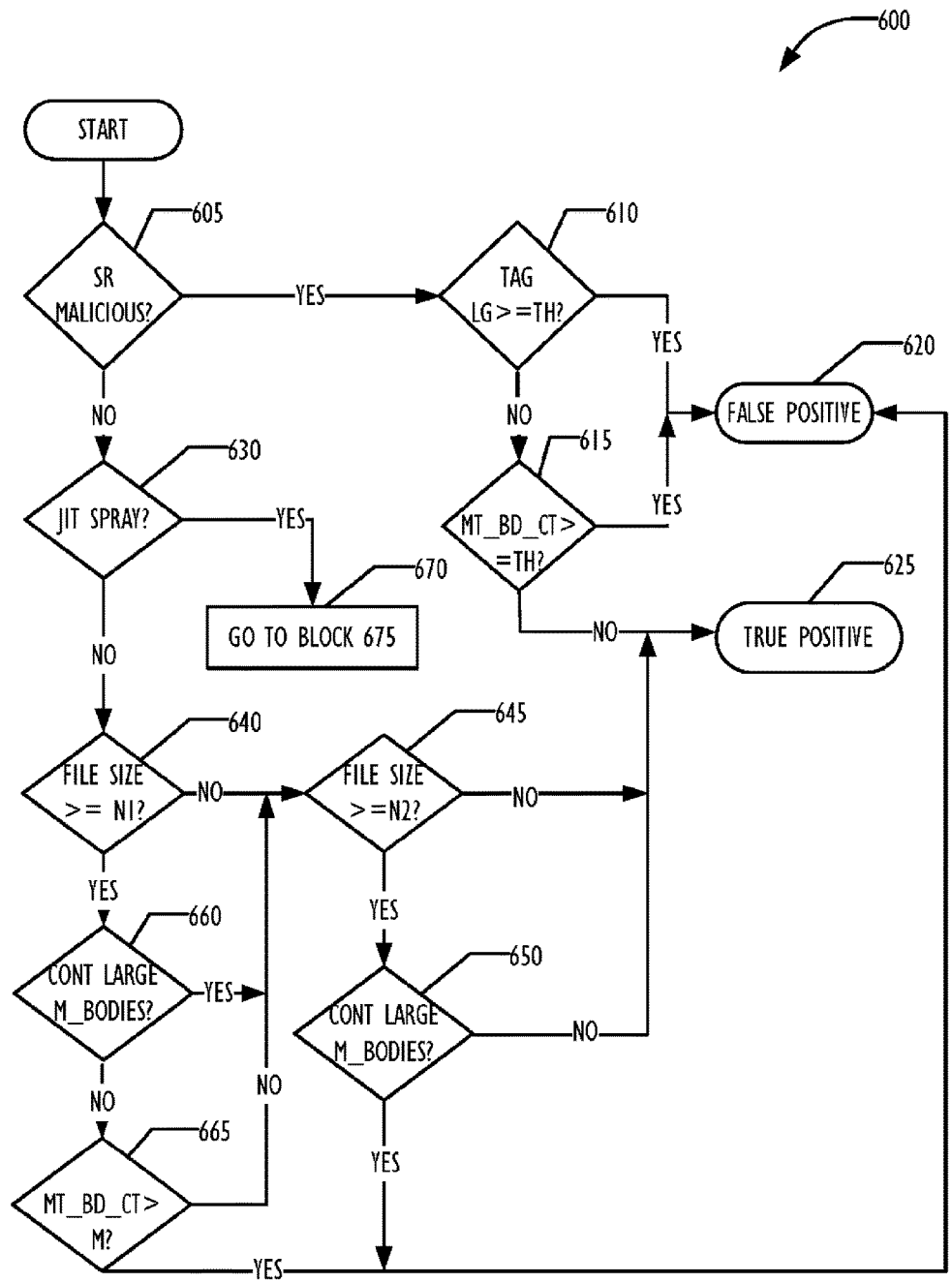
FIG. 6A-6B are flow diagrams for false positive identification approaches according to one or more disclosed embodiments.

The detection approaches discussed herein have also been found to be highly accurate resulting in a minimal number of false positive identification of malware. Moreover, false positive removal operation may be utilized to reduce even the minimal number of false positives. Referring to FIG. 6A, a false positive removal operation 600 may start by determining if the file was determined to be malicious by having a shellcode string (block 605). If the file was detected as having a malicious shellcode string (the "YES" prong of block 605), then the operation determines if the length for the ABC tag of the Flash file is equal to or larger than a first specific threshold (block 610). The first specific threshold may be predetermined or dynamically chosen. In one embodiment, the threshold is 512 KB. When the ABC tag length is equal to or larger than the specified threshold (the "YES" prong of block 610), then the identification of the file as malicious is a false positive (block 620) and can be over ignored. This is because the size of files which contain malicious exploitations are generally small.

If the ABC tag length is smaller than the specified threshold (the "NO" prong of block 610), then the operation determines if the number of method bodies in the ActionScript ABC code is equal to or larger than a second specified threshold (block 615). A method body signifies the body of a method included in the code. The number of method bodies in the code is generally referred to as method body count (method_body_count). When the method body count is equal to or larger than the second specified threshold (the "YES" prong of block 615), then the identification of the file as malicious is a false positive and can be overlooked. In one embodiment, the second specified threshold is 200. If the method body count is not larger than the second specified threshold, then the identification is a true positive and the file should remain identified as malicious (block 625). In one embodiment, the first and second specified thresholds are determined by examining a significant number of Flash files and identifying characteristics of the ones that are falsely detected as being malicious.

When the identification of the file as being malicious was not by detecting a shellcode string (the "NO" prong of block 605), then the identification should be due to detecting repeated key instructions in the bytecode. In this case, the operation moves to determine if the exploitation method involved was a JIT spray (block 630). This may be done by examining the repeated key instruction. If the repeated key instruction is bitxor, bitor, or in, then the malicious method may be identified as a JIT spray. Other specific key instructions may also indicate a JIT spray. When the exploitation method is not identified as a JIT spray (the "NO" prong of block 630), then the operation determines if the size of the Flash file is equal to or larger than a specified number, N1 (block 640). When the size of the Flash file is smaller than N1 (the "NO" prong of block 640), then the operation determines if the size of the file is equal to or larger than a second specified number, N2 (block 645). In one embodiment, N1 is 1 MB and N2 is 512 KB. Other numbers may also be used. Similar to the first and second specified thresholds, N1, N2 may be determined by examining a significant number of Flash files and identifying characteristics of the ones that are falsely detected as being malicious. If the size of the Flash file is larger than or equal to N2 (the "YES" prong of block 645), then the operation determines if there are continuous large size method bodies in the code (block 650). Continuous large size method bodies refer to multiple consecutive method bodies with equal sizes whose size surpasses a predetermined number. For example, when the size of m_body[100], m_body[101] . . . , and m_body[150] are all 1000 bytes, these method bodies are identified as being Continuous large size method bodies. The number of consecutive method bodies whose sizes are equal and larger than a predetermined number may vary in different embodiments. When the code contains no continuous large size method bodies (the "YES" prong of block 650), then the file is falsely identified as being malicious (block 620) and the identification can be overlooked. If there are no continuous large size method bodies in the code (the "NO" prong of block 650), then the malicious detection was correct and should be maintained (block 625).

In instances where the size of the Flash file is determined to be larger than or equal to N1 (the "YES" prong of block 640), then the operation determines if the file contains continuous large size method bodies and if so (the "YES" prong of block 660), it moves to block 645 and follows the steps discussed above. If no continuous large size method bodies are detected at this stage (the "NO" prong of block 660), then the operation determines if the method body count is larger than a number M (block 665). In one embodiment, the number M equals 8000. The number M may vary and it may be determined by examining a significant number of Flash files and identifying characteristics of the ones that are falsely detected as being malicious. When the method body count is larger than M (the "YES" prong of block 665), then the file is falsely identified as being malicious (block 620). If the method body count is smaller than M, then the operation moves to block 645 again.

Figure 6B:
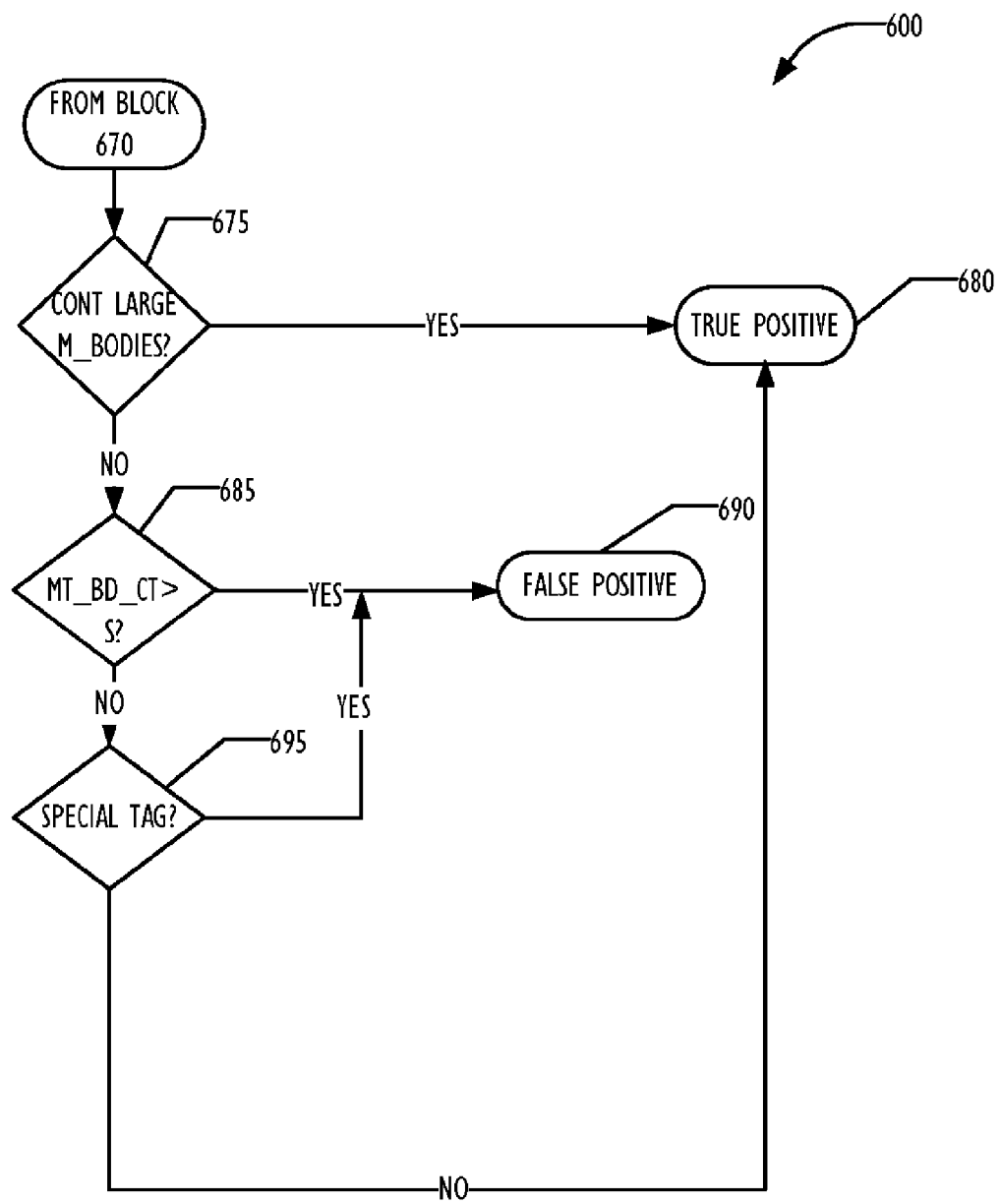

During the operation 600, if it is determined that the detected malicious exploitation is a JIT spray (the "YES" prong of block 630), then the operation moves to block 675 of FIG. 6B (block 670) to determine if a false positive was detected. For JIT spray exploitations, the operation determines if the code contains continuous large size method bodies (block 675). When a Flash file containing a JIT spray exploitation includes continuous large size method bodies (the "YES" prong of block 675), the detection is a true positive and should be maintained (block 680). If the code does not contain continuous large size method bodies (the "NO" prong of block 675), then it is determined if the method body count is larger than a specified number S (block 685). In one embodiment, the number S is equal to 10000. Similar to the number M, S may be determined by examining a significant number of Flash files and identifying characteristics of the ones that are falsely detected as being malicious. When the method body count is larger than S (the "YES" prong of block 685), then the file is falsely identified as being malicious and the identification should be overlooked (block 690). When the method body count is smaller than S (the "NO" prong of block 685), then the operation determines if one or more particular special tags are present in the file and if so (the "YES" prong of block 695) indicates that the malicious detection was a false positive (block 690). In one embodiment, the special tags are DefineSound and DefineShape3. That is because generally malicious Flash files do not contain sound data. If no special tags are present, then the file is a true positive (block 680).

Although the embodiments disclosed herein are described with respect to Flash files, these embodiments or variations thereof may also be used in other types of multimedia files. In particular, the embodiments may be used in multimedia files that are bytecode-based and/or which include an array or table similar to the constant pool table of a Flash file. For example, the embodiments may be used in some JAVA® class files ("JAVA" is a registered trademark of Oracle America, Inc.).

EXAMPLES

The following examples pertain to further embodiments. Example 1 is at least one computer readable medium on which are stored instructions comprising instructions that when executed cause a programmable device to: match an instruction in a multimedia file with a predetermined list of instructions; identify repetitions of the matched instruction in the multimedia file; calculate a distance between repetitions of the instruction; and identify the multimedia file as malicious responsive to equidistant repetitions of the instruction.

Example 2 includes the subject matter of example 1, further comprising instructions to eliminate false positive identifications of the multimedia file as malicious.

Example 3 includes the subject matter of example 1, further comprising instructions to recognize the file as being falsely identified as malicious if a length of a tag in the multimedia file is larger or equal to a first predetermined threshold.

Example 4 includes the subject matter of example 1, further comprising instructions to recognize the file as being falsely identified as malicious if a method body count of the multimedia file is larger than or equal to a second predetermined threshold.

Example 5 includes the subject matter of example 1, further comprising instructions to cause the one or more processors to: examine one or more strings in one or more data structures of the multimedia file that store constants; and identify the multimedia file as being malicious if any of the one or more strings are identified by a shellcode logic as being indicative of a shellcode.

Example 6 includes the subject matter of example 5, wherein the shellcode logic comprises a shellcode database.

Example 7 includes the subject matter of example 6, further comprising instructions to cause the one or more processors to identify the multimedia file as containing a malicious string when at least one of the one or more strings match one of one or more identified strings in the shellcode database.

Example 8 includes the subject matter of any of examples 1-7, wherein the multimedia file is identified as being malicious when a minimum number of the repetitions are equidistant.

Example 9 includes the subject matter of any of examples 1-7, wherein the instruction comprises bytecode instruction.

Example 10 is an apparatus configured to perform analysis of multimedia files, comprising: memory means; and processing means, communicatively coupled to the memory means, wherein the memory means stores instructions to configure the processing means to: receive one or more multimedia files; examine contents of one or more data structures that store constants for each received multimedia file; and identify the multimedia file as being malicious when one or more strings in the one or more data structures are identified by a shellcode logic as being indicative of a shellcode.

Example 11 includes the subject matter of example 10, wherein the instructions further cause the processing means to: match an instruction in the multimedia file with a predetermined list of instructions; identify repetitions of the matched instruction in the multimedia file; calculate a distance between repetitions of the matched instruction; and identify the multimedia file as malicious responsive to equidistant repetitions of the matched instruction.

Example 12 includes the subject matter of example 11, wherein the multimedia file is identified as being malicious when a minimum number of the repetitions are equidistant.

Example 13 includes the subject matter of example 11, wherein the multimedia file is identified as being malicious when two or more of the repetitions are equidistant.

Example 14 includes the subject matter of example 11, wherein the instructions further cause the processing means to determine if the file is being falsely identified as malicious.

Example 15 includes the subject matter of example 11, wherein the matched instruction comprises bytecode instruction.

Example 16 includes the subject matter of example 15, further comprising instructions to cause the processing means to recognize the file as being falsely identified as malicious if a length of a tag in the multimedia file is larger or equal to a first predetermined threshold.

Example 17 includes the subject matter of example 15, wherein the instructions further cause the processing means to recognize the file as being falsely identified as malicious if a method body count of the multimedia file is larger than or equal to a second predetermined threshold.

Example 18 includes the subject matter of example 15, further comprising instructions to cause the one or more processing means to: determine if the code contains one or more continuous large size method bodies, if the code is determined to contain a just-in-time spray exploitation; and recognizing the multimedia file as being falsely identified as malicious when the code is determined to not contain one or more continuous large size method bodies and a method body count is larger than a predetermined threshold.

Example 19 is a method, comprising the steps of: matching an instruction in a multimedia file with a predetermined list of instructions; identifying repetitions of the matched instruction in the multimedia file; calculating a distance between repetitions of the instruction; and identifying the multimedia file as malicious responsive to equidistant repetitions of the instruction.

Example 20 includes the subject matter of example 19, further comprising the steps of identifying the multimedia file as being malicious if any of one or more strings in one or more data structures that store constants for the multimedia file are identified by a shellcode logic as being indicative of a shellcode.

Example 21 includes the subject matter of example 20, further comprising the steps of eliminating false positive identifications of the multimedia file as malicious.

Example 22 includes the subject matter of example 21, further comprising the steps of: determining if the code contains one or more continuous large size method bodies, if the code is determined to contain a just-in-time spray exploitation; and recognizing the multimedia file as being falsely identified as malicious when the code is determined to not contain one or more continuous large size method bodies and a method body count is larger than a predetermined threshold.

Example 23 includes the subject matter of example 21, further comprising the steps of: determining if the code contains one or more continuous large size method bodies, if the code is determined to contain a just-in-time spray exploitation; and recognizing the multimedia file as being falsely identified as malicious when the code is determined to not contain one or more continuous large size method bodies and the multimedia file contains one or more special tags.

Example 24 includes the subject matter of example 19, further comprising the steps of identifying the multimedia file as being malicious when a minimum number of the repetitions are equidistant.

Example 25 includes the subject matter of example 19, wherein the instruction comprises bytecode instruction.

Example 26 includes an apparatus configured to perform analysis of multimedia files, comprising a memory; and one or more processing units, communicatively coupled to the memory, wherein the memory stores instructions to configure the one or more processing units to: receive one or more multimedia files; examine contents of one or more data structures that store constants for each received multimedia file; and identify the multimedia file as being malicious when one or more strings in the one or more data structures are identified by a shellcode logic as being indicative of a shellcode.

Example 27 includes the subject matter of example 26, wherein the instructions further cause the one or more processing units to: match an instruction in the multimedia file with a predetermined list of instructions; identify repetitions of the matched instruction in the multimedia file; calculate a distance between repetitions of the matched instruction; and identify the multimedia file as malicious responsive to equidistant repetitions of the matched instruction.

Example 28 includes the subject matter of example 27, wherein the multimedia file is identified as being malicious when a minimum number of the repetitions are equidistant.

Example 29 includes the subject matter of example 27, wherein the multimedia file is identified as being malicious when two or more of the repetitions are equidistant.

Example 30 includes the subject matter of example 27, wherein the instructions further cause the one or more processing units to determine if the file is being falsely identified as malicious.

Example 31 includes the subject matter of example 30, further comprising instructions to cause the one or more processing means to: determine if a bytecode of the multimedia file contains one or more continuous large size method bodies, when the bytecode is determined to contain a just-in-time spray exploitation; and recognizing the multimedia file as being falsely identified as malicious when the bytecode is determined to not contain one or more continuous large size method bodies and a method body count is larger than a predetermined threshold.

Example 32 includes the subject matter of example 26, wherein the instructions further cause the one or more processing units to determine if the file is being falsely identified as malicious.

Example 33 includes the subject matter of example 32, further comprising instructions to cause the one or more processing units to recognize the file as being falsely identified as malicious if a length of a tag in the multimedia file is larger or equal to a first predetermined threshold.

Example 34 includes the subject matter of example 32, wherein the instructions further cause the one or more processing units to recognize the file as being falsely identified as malicious if a method body count of the multimedia file is larger than or equal to a second predetermined threshold.

Example 35 includes the subject matter of example 26, further comprising instructions to cause the one or more processing units to identify the multimedia file as containing a malicious string when at least one of the one or more strings match one of one or more identified strings in the shellcode logic.

Example 36 includes the subject matter of example 26, wherein the shellcode logic comprises a shellcode database.

Example 37 includes a machine readable medium including code, when executed, to cause a machine to perform the method of any one of examples 19, 20, 21, 22, 23, 24, or 25.

Example 38 includes an apparatus, comprising: memory means; one or more processing means; and a computer readable medium comprising computer executable instructions stored thereon to cause the one or more processing means to: match an instruction in a multimedia file with a predetermined list of instructions; identify repetitions of the matched instruction in the multimedia file; calculate a distance between repetitions of the matched instruction; and identify the multimedia file as malicious responsive to equidistant repetitions of the matched instruction.

Example 39 includes the subject matter of example 38, wherein the instructions further cause the one or more processing means to: examine one or more strings in one or more data structures that store constants for the multimedia file; and identify the multimedia file as being malicious if any of the one or more strings are identified by a shellcode logic as being indicative of a shellcode.

Example 40 includes the subject matter of example 39, wherein the instructions further cause the one or more processing means to identify the multimedia file as containing a malicious string when at least one of the one or more strings match one of one or more identified strings in the shellcode logic.

Example 41 includes the subject matter of example 40, wherein the shellcode logic comprises a shellcode database.

Example 42 includes the subject matter of example 38, wherein the multimedia file is identified as being malicious when a minimum number of the repetitions are equidistant.

Example 43 includes the subject matter of example 38, further comprising instructions to eliminate false positive identifications of the multimedia file as malicious.

Example 44 includes a network device configured to perform analysis of multimedia files, comprising: one or more processors; and a memory communicatively coupled to the one or more processors, wherein the memory stores instructions to cause the one or more processors to: receive one or more multimedia files; examine contents of one or more data structures that store constants for each received multimedia file; and identify the multimedia file as being malicious when one or more strings in the one or more data structures are identified by a shellcode logic as being indicative of a shellcode.

Example 45 includes the subject matter of example 44, wherein the instructions further cause the one or more processors to: match an instruction in the multimedia file with a predetermined list of instructions; identify repetitions of the matched instruction in the multimedia file; calculate a distance between repetitions of the matched instruction; and identify the multimedia file as malicious responsive to equidistant repetitions of the matched instruction.

Example 46 includes the subject matter of example 45, wherein the multimedia file is identified as being malicious when a minimum number of the repetitions are equidistant.

Example 47 includes the subject matter of example 45, wherein the multimedia file is identified as being malicious when two or more of the repetitions are equidistant.

Example 48 includes the subject matter of example 45, wherein the instructions further cause the one or more processors to determine if the file is being falsely identified as malicious.

Example 49 includes the subject matter of example 44, wherein the instructions further cause the processing means to determine if the file is being falsely identified as malicious.

Example 50 includes the subject matter of example 49, further comprising instructions to cause the processing means to recognize the file as being falsely identified as malicious if a length of a tag in the multimedia file is larger or equal to a first predetermined threshold.

Example 51 includes the subject matter of example 49, wherein the instructions further cause the one or more processors to recognize the file as being falsely identified as malicious if a method body count of the multimedia file is larger than or equal to a second predetermined threshold.

Example 52 includes the subject matter of example 49, further comprising instructions to cause the one or more processors to: determine if a bytecode of the multimedia file contains one or more continuous large size method bodies, when the bytecode is determined to contain a just-in-time spray exploitation; and recognizing the multimedia file as being falsely identified as malicious when the bytecode is determined to not contain one or more continuous large size method bodies and a method body count is larger than a predetermined threshold.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process acts may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

What is claimed is:

1. At least one storage disk or storage device comprising a set of instructions that, when executed, cause a processor to at least:
   match a first instruction in a compiled bytecode portion of a multimedia file with a second instruction in a list of instructions;
   match a third instruction in the compiled bytecode portion with the second instruction;
   match a fourth instruction in the compiled bytecode portion with the second instruction;
   match a fifth instruction in the compiled bytecode portion with the second instruction;
   examine one or more strings in one or more data structures of the multimedia file that store constants; and
   identify the multimedia file as malicious when any of the one or more strings is identified by a shellcode logic as being indicative of a shellcode, and when a first distance between the first instruction and the third instruction equals at least one of (a) a second distance between the fourth instruction and the first instruction or (b) a third distance between the fourth instruction and the third instruction, even though a fourth distance between the fifth instruction and at least one of the first instruction, the third instruction, or the fourth instruction does not equal the first distance.

2. The storage disk or storage device of claim 1, wherein the set of instructions, when executed, cause the processor to eliminate false positive identifications of the multimedia file as malicious.

3. The storage disk or storage device of claim 1, wherein the set of instructions, when executed, cause the processor to recognize the file as falsely identified as malicious if a length of a tag in the multimedia file satisfies a threshold.

4. The storage disk or storage device of claim 1, wherein the set of instructions, when executed, cause the processor to recognize the file as falsely identified as malicious if a method body count of the multimedia file satisfies a threshold.

5. The storage disk or storage device of claim 1, wherein the shellcode logic includes a shellcode database.

6. The storage disk or storage device of claim 5, wherein the set of instructions, when executed, cause the processor to identify the multimedia file as containing a malicious string when at least one of the one or more strings match one or more identified strings in the shellcode database.

7. The storage disk or storage device of claim 1, wherein the set of instructions, when executed, cause the processor to identify the multimedia file as malicious when a number of equidistant repetitions of the second instruction satisfies a threshold.

8. The storage disk or storage device of claim 1, wherein the first instruction includes a bytecode instruction.

9. An apparatus configured to perform analysis of multimedia files, the apparatus comprising:
at least one processor; and
memory including a set of instructions that, when executed, cause the at least one processor to at least:
match a first instruction in a compiled bytecode portion of a multimedia file with a second instruction in a list of instructions;
match a third instruction in the compiled bytecode portion with the second instruction;
match a fourth instruction in the compiled bytecode portion with the second instruction;
match a fifth instruction in the compiled bytecode portion with the second instruction;
examine one or more strings in one or more data structures of the multimedia file that store constants; and
identify the multimedia file as malicious when any of the one or more strings is identified by a shellcode logic as being indicative of a shellcode, and when a first distance between the first instruction and the third instruction equals at least one of (a) a second distance between the fourth instruction and the first instruction or (b) a third distance between the fourth instruction and the third instruction, even though a fourth distance between the fifth instruction and at least one of the first instruction, the third instruction, or the fourth instruction does not equal the first distance.

10. The apparatus of claim 9, wherein the at least one processor is to identify the multimedia file as malicious when a number of equidistant repetitions of the second instruction satisfies a threshold.

11. The apparatus of claim 10, wherein the threshold is at least two.

12. The apparatus of claim 9, wherein the at least one processor is to determine if the file is falsely identified as malicious.

13. The apparatus of claim 9, wherein the first instruction includes a bytecode instruction.

14. The apparatus of claim 12, wherein the at least one processor is to determine the file as falsely identified as malicious if a length of a tag in the multimedia file satisfies a threshold.

15. The apparatus of claim 12, wherein the at least one processor is to determine the file as falsely identified as malicious if a method body count of the multimedia file satisfies a threshold.

16. The apparatus of claim 12, wherein the at least one processor is to:
determine if a bytecode of the multimedia file contains one or more continuous large size method bodies, when the bytecode is determined to contain a just-in-time spray exploitation; and
recognize the multimedia file as falsely identified as malicious when the bytecode is determined to not contain one or more of the continuous large size method bodies and a method body count satisfies a threshold.

17. A method, comprising:
matching, by executing an executable with a processor, a first instruction in a compiled bytecode portion of a multimedia file with a second instruction in a list of instructions;
matching, by executing an executable with the processor, a third instruction in the compiled bytecode portion with the second instruction;
matching, by executing an executable with the processor, a fourth instruction in the compiled bytecode portion with the second instruction;
matching, by executing an executable with the processor, a fifth instruction in the compiled bytecode portion with the second instruction;
examining, by executing an executable with the processor, one or more strings in one or more data structures of the multimedia file that store constants; and
identifying, by executing an executable with the processor, the multimedia file as malicious when any of the one or more strings is identified by a shellcode logic as being indicative of a shellcode, and when a first distance between the first instruction and the third instruction equals at least one of (a) a second distance between the fourth instruction and the first instruction or (b) a third distance between the fourth instruction and the third instruction, even though a fourth distance between the fifth instruction and at least one of the first instruction, the third instruction, or the fourth instruction does not equal the first distance.

18. The method of claim 17, further including eliminating false positive identifications of the multimedia file as malicious.

19. The method of claim 18, wherein the eliminating of the false positive identifications includes:
determining if a bytecode of the multimedia file contains one or more continuous large size method bodies, when the bytecode is determined to contain a just-in-time spray exploitation; and
recognizing the multimedia file as falsely identified as malicious when the bytecode code is determined to not contain the one or more continuous large size method bodies and a method body count satisfies a threshold.

20. The method of claim 18, wherein the eliminating of the false positive identifications includes:
determining if a bytecode of the multimedia file contains one or more continuous large size method bodies, when the code is determined to contain a just-in-time spray exploitation; and
recognizing the multimedia file as falsely identified as malicious when the bytecode is determined to not contain one or more continuous large size method bodies and the multimedia file contains one or more special tags.

21. The method of claim 17, wherein the identifying of the multimedia file as malicious includes determining a number of equidistant repetitions of the second instruction satisfies a threshold.

22. The method of claim 17, wherein the first instruction includes a bytecode instruction.

* * * * *